United States Patent [19]

Arksey

[11] Patent Number: 6,099,878
[45] Date of Patent: Aug. 8, 2000

[54] AUTOMATED ESPRESSO AND MILK AERATION METHOD

[75] Inventor: Matthew L. Arksey, Seattle, Wash.

[73] Assignee: Acorto, Inc., Bellevue, Wash.

[21] Appl. No.: 09/419,618

[22] Filed: Oct. 14, 1999

Related U.S. Application Data

[62] Division of application No. 09/183,635, Oct. 30, 1998, Pat. No. 6,019,032.

[51] Int. Cl.[7] ........................................................ A23F 5/00
[52] U.S. Cl. ............................ 426/231; 426/511; 426/433
[58] Field of Search ..................................... 426/231, 511, 426/590, 433, 506; 99/452, 323.1, 293, 286

[56] References Cited

U.S. PATENT DOCUMENTS

| | | |
|---|---|---|
| 610,873 | 9/1898 | Collis . |
| 828,086 | 8/1906 | Bowers . |
| 1,800,368 | 4/1931 | Tomlinson . |
| 2,014,325 | 9/1935 | Grilli .................................................. 53/3 |
| 2,658,645 | 11/1953 | Harris ............................................. 222/70 |
| 2,680,802 | 6/1954 | Bremer et al. ................................. 219/40 |
| 2,682,984 | 7/1954 | Melikian et al. ........................... 226/46.6 |
| 2,827,845 | 3/1958 | Richeson ........................................ 99/289 |
| 2,907,265 | 10/1959 | Se Bastian .................................... 99/283 |
| 2,957,607 | 10/1960 | Smith ............................................. 222/70 |
| 3,100,585 | 8/1963 | Nail et al. ...................................... 222/63 |
| 3,385,569 | 5/1968 | Bookout ........................................ 259/60 |
| 3,390,626 | 7/1968 | Holstein et al. .............................. 99/283 |
| 3,599,333 | 8/1971 | Reichenberger .............................. 222/23 |
| 4,123,800 | 10/1978 | Mazzei ........................................ 366/150 |
| 4,242,568 | 12/1980 | Wunderlin et al. .......................... 219/296 |
| 4,392,588 | 7/1983 | Scalera ..................................... 222/129.4 |
| 4,406,217 | 9/1983 | Oota ............................................... 99/280 |
| 4,484,515 | 11/1984 | Illy ................................................. 99/282 |
| 4,715,274 | 12/1987 | Paoletti ......................................... 99/454 |
| 4,735,133 | 4/1988 | Paoletti ......................................... 99/454 |
| 4,767,632 | 8/1988 | Meier ........................................... 426/231 |
| 4,779,519 | 10/1988 | Giuliano ....................................... 99/275 |
| 4,815,633 | 3/1989 | Kondo et al. ............................. 222/129.4 |
| 4,852,474 | 8/1989 | Mahlich et al. ............................. 99/293 |
| 4,921,640 | 5/1990 | Wu ................................................ 261/76 |
| 4,922,810 | 5/1990 | Siccardi ........................................ 99/323 |
| 4,945,824 | 8/1990 | Borgmann .................................... 99/293 |
| 4,949,631 | 8/1990 | Fregnan ........................................ 99/452 |
| 4,960,042 | 10/1990 | Grossi ........................................... 99/293 |
| 4,970,948 | 11/1990 | Giannelli ...................................... 99/280 |
| 5,207,148 | 5/1993 | Anderson et al. ........................... 99/281 |
| 5,265,520 | 11/1993 | Giuliano ................................... 99/323.1 |
| 5,393,540 | 2/1995 | Bunn et al. ................................ 426/231 |
| 5,509,349 | 4/1996 | Anderson et al. ........................ 99/323.1 |

FOREIGN PATENT DOCUMENTS

| | | |
|---|---|---|
| 0 157 069 | 10/1985 | European Pat. Off. . |
| 0 195 750 | 9/1986 | European Pat. Off. . |
| 0 295 555 | 12/1988 | European Pat. Off. . |
| 0 328 704 | 8/1989 | European Pat. Off. . |
| 0 328 705 | 8/1989 | European Pat. Off. . |
| 0 344 859 | 12/1989 | European Pat. Off. . |
| 0 480 928 | 4/1992 | European Pat. Off. . |
| 1.299.562 | 5/1961 | France . |
| 3631771 A1 | 3/1988 | Germany . |
| 3829326 A1 | 3/1990 | Germany . |
| 449097 | 6/1949 | Italy . |
| 6-38028 | 2/1994 | Japan . |
| 828529 | 2/1960 | United Kingdom . |
| WO 91/00041 | 1/1991 | WIPO . |

*Primary Examiner*—George C. Yeung
*Attorney, Agent, or Firm*—Christensen, O'Connor, Johnson & Kindness PLLC

[57] ABSTRACT

A fully automatic, milk inclusive espresso coffee machine which includes coffee bean grinding and brewing apparatus and a milk aeration system which pumps a selection of milk from an internal refrigerator through a choice of aeration processes to a steaming apparatus for heating and further conditioning the milk for joining the brewed coffee liquor. With each beverage production cycle all milk is hygienically either served or returned to its refrigerated reservoir. A process is disclosed which includes pumping milk, all in a refrigerated environment, selectively along a plurality of milk lines one of which may inject air for foaming the milk to a steam delivery line for heating and steaming it and delivering it to a beverage cup. After the desired amount of milk has been delivered, the steam flow continues momentarily to cleanse the line of residual milk.

2 Claims, 1 Drawing Sheet

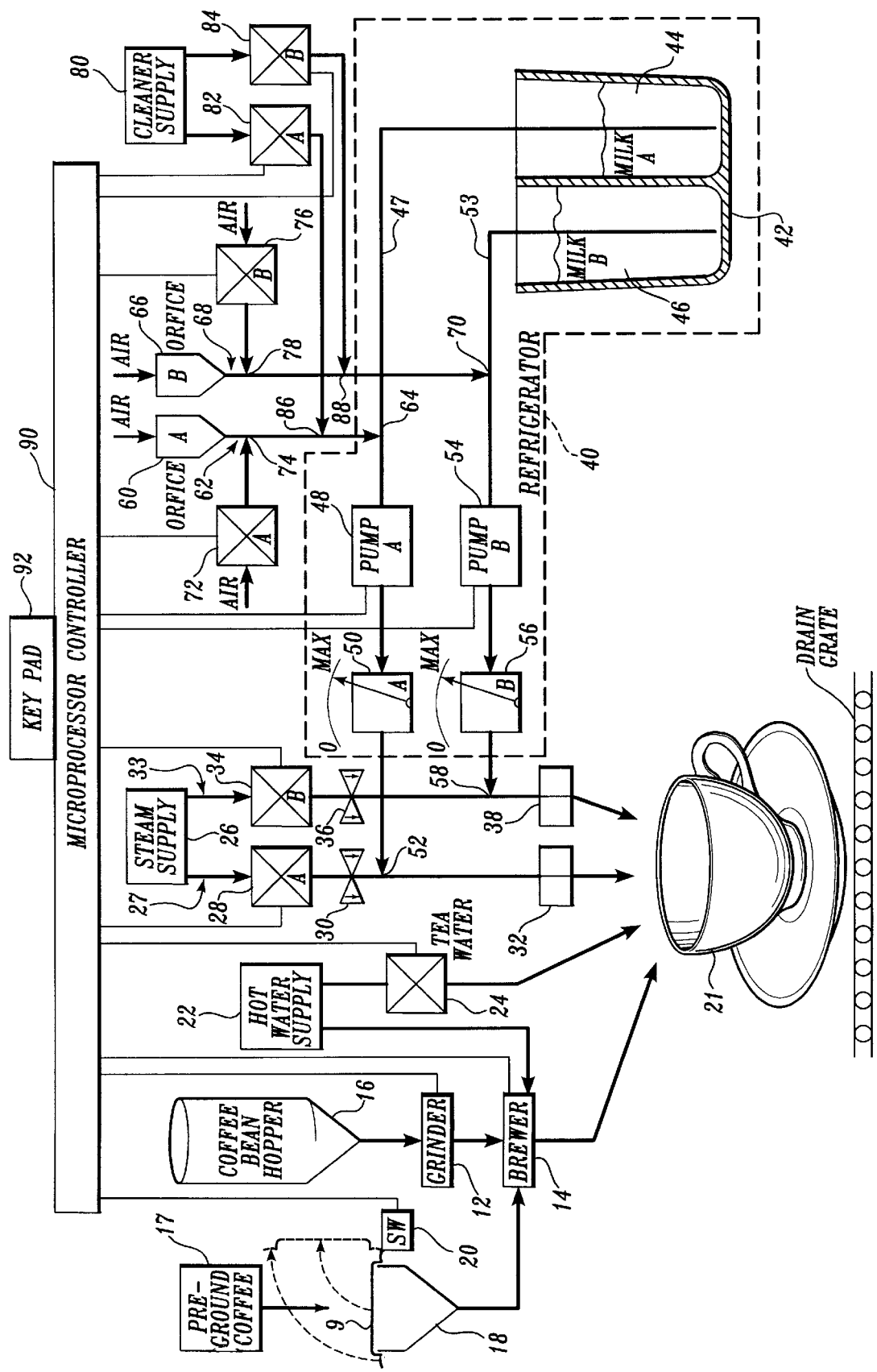

AUTOMATED ESPRESSO AND MILK AERATION METHOD

RELATED APPLICATIONS

This application is a divisional of prior application Ser. No. 09/183,635, filed Oct. 30, 1998, now U.S. Pat. No. 6,019,032.

BACKGROUND OF THE INVENTION

This invention relates generally to espresso coffee making and more particularly to a system and method for providing and serving, fully automatically, such coffee beverages as cafe latte, cappuccino, and the like, from roasted whole beans and fresh, cold milk.

The practice of brewing espresso and making and serving steamed or foamed milk inclusive beverages such as lattes or cappuccinos is a well developed field and now includes fully automatic machines which provide a choice of beans, e.g. "regular" or "decaf", and integrally housed, refrigerated milk. In the most compact and hygienically excellent such machines, the milk is refrigerated within the console of the integral structure until it is drawn to the aeration and steaming apparatus and delivered to the serving cup in timed cooperation with the brewing process. The milk path is then cleared of residual milk and steam cleaned whereby all milk is either aerated and served or refrigerated after each drink preparation cycle.

A machine which successfully achieves all these functions with hygienic excellence is thoroughly described in U.S. Pat. No. 5,207,148 issued May 4, 1993, and entitled "Automated Milk, Inclusive Coffee Apparatus".

In the system described in the referenced patent, milk is drawn from an internal, refrigerated single source by a steam driven venturi and then forced through a vortex chamber for aeration before being delivered to the beverage cup. The timing of the steam valving being such that after the milk valve between the milk supply and the venturi throat is closed, the steam flow briefly continues to cleanse the venturi, vortex chamber, and all delivery piping to the serving cup. In practice, the valving of the refrigerated milk into the steam heated venturi throat and the calibration and adjustments to the several parameters of the venturi and vortex chambers have been complex and are exceedingly interdependent upon each other thusly constituting a delicate and relatively critical maintenance operation requiring special skills.

Accordingly, it is an object of the present invention to provide an automated, hygienically safe milk inclusive espresso system and method, which does not depend on steam driven venturi technology, for drawing milk from an internal refrigerated source, aerating it, heating it, and delivering it to the beverage cup.

It is another object to provide in such apparatus a milk delivery system, which is rugged, reliable, and inexpensive to manufacture and maintain.

It is another object to provide such milk aeration, heating, and delivery with an exceedingly high degree of versatility, with respect to such parameters as milk selection, e.g. low fat versus non fat, latte versus cappuccino, degree of milk aeration, temperature of the delivered aerated milk, and its quantity.

It is another object to provide such apparatus which in addition to achieving hygienic pumping of the milk with each serving cycle, may be programmed to provide automatically a periodic complete system cleaning process.

It is another object to provide such a combination in which the adjustability of the various operating parameters of the several components such as air flow, fluid flow, steam flow, and timing are essentially independent of each other.

SUMMARY OF THE INVENTION

Briefly, these and other objects are achieved in accordance with the features of a presently preferred example of the invention which include within a single console a key pad operated master microprocessor controller and in cooperative relation therewith a coffee bean grinding, brewing, and espresso delivery system, a hot water supply for the coffee brewing or for delivery as tea water, a steam supply having two outlet lines, a bifurcated refrigerated milk supply each portion thereof being connected to a separate pump for drawing milk therefrom and delivering it to a respective one of the steam outlet lines from where it is delivered to the serving cup essentially along with the brewed coffee liquor. In the delivery line, between the milk supply and each pump, i.e. on its reduced pressure side, an air inlet orifice is provided for inserting air into the milk whereby it is foamed as it is forced through the pump toward the steam line. When a line is to provide steamed milk, not foamed, as for a latte drink, its respective orifice is substantially reduced or totally capped. Accordingly one line may be activated when foamed milk cappuccino drink is ordered by the controller; or the other line may be activated when a steamed milk Latte is signaled.

Further to indicate the versatility of this combination, the milk supply may contain milk of different character, e.g. regular and non fat, respectively, and the air inlet orifices may be both substantially closed or both open whereby only lattes or only cappuccinos are delivered; however, they would be served with a choice of milk. The apparatus may further be adapted to serve cold milk, without steam flow, but with a subsequent steam purging of the system.

THE DRAWING

The single FIGURE is an overall block diagram illustrating the structural components of an example of the invention.

DETAILED DESCRIPTION OF A PREFERRED EMBODIMENT

In accordance with the structural, mechanical aspects of the invention, details of the method and operation being discussed infra, the example of an automated espresso and milk aeration system 10 shown and described includes an integral console housing, not shown, within which is mounted a coffee bean grinder 12, and a brewer assembly 14. A commercially available satisfactory example of each of these components is a grinder Model EK10 supplied by Stawert Muhlenbau m.b.H. of Hamburg, Germany, and a brewer Model F Group supplied by Carimali S.p.A. of Bergamo, Italy. Other essential features of the brewer 14 include a brewing cylinder into which a measured charge of ground coffee is placed by gravity feed from the grinder 12 which receives the measure of coffee from a hopper 16. In a typical operation, the coffee beans in the hopper 16 may be a particular variety of "regular"; and when a different type of coffee 17 is desired, such as "decaf", it may be pre-ground and dropped into the brewer via a bypass chute 18, the chute 18 having a hinged lid 19 such that when lifted, as indicated by phantom lines on the drawing, a switch 20 is activated and sends a signal to the controller resulting in the grinder actuation being suppressed for one beverage cycle. The brewer assembly then brews, in conventional manner, using high temperature water at high pressure, a measure of espresso liquor and delivers it to a serving cup 21.

A hot water supply 22 provides water at a temperature of approximately 190° F. and pressure of approximately 130 psi to the brewer assembly 14 and, when desired as for tea or hot chocolate or the like, through a valve 24 directly to the cup 21. A steam supply 26 is shown for providing steam at approximately 240° F. and 13 psi for steaming or foaming milk to be added to the espresso beverage being delivered to the beverage cup station 21 from the brewer assembly 14. The steam thus available is delivered along either of two paths: a first such path 27 comprises a valve A, 28, a check valve 30, and a restrictor 32; and a second path 33 similarly includes a valve B, 34, a check valve 36, and a restrictor 38. The tubing between these components is typically 3/16" inner diameter while the diameter of the orifice of the restrictors is approximately 1/16".

Disposed integrally within the console of the system 10 is a Peltier refrigerator 40 in which is housed a milk supply 42 which may be, as shown, bifurcated into 2 chambers or containers designated milk A, 44, and milk B, 46. As discussed infra, in some applications it may be desired that the otherwise bifurcated supply be a unitary or single supply of milk.

The A milk chamber 44 is connected by a milk line 47 to the beverage cup 21 through a milk pump A, 48, and a milk flow control valve 50 from whence through a tee junction 52 it joins the steam line 27. Similarly, the B milk chamber 46 is connected by a milk line 53 through a milk pump B, 54 and a milk flow control valve 56 from whence through a tee junction 58 it joins the steam line 33 for delivery to the beverage cup 21. It is to be noted that the pumps 48, 54, as well as the valves 50, 56, when desired, are disposed within the refrigerator 40. It will be understood from the description and discussion infra that microbe growth in the milk is effectively precluded by all milk being either returned to the refrigerated space or sent on to the hot beverage cup 21 with each cycle of drink preparation.

The milk pumps 48, 54 are, in this example, "heavy syrup", oscillating piston pumps model 1228PXBER1N supplied by Fluid-O-tech of Milan, Italy. In the instant application, with appropriate adjustment of the milk control valves 50, 56, they are self priming and each deliver approximately ½ ounce of milk per second to their respective steam lines 27, 33.

An air inlet orifice A, 60 is connected by an aeration line 62 to the milk line 47 upstream from the inlet of milk pump 48 at a tee junction 64. Similarly, an air inlet orifice B, 66 is connected by an aeration line 68 to the milk line 53 at a tee junction 70.

A purge air valve A, 72 is connected to the aeration line 62 downstream from the orifice 60 at a tee junction 74; and a like purge air valve B, 76 is connected to the aeration line 68 at a tee junction 78. Similarly, a cleaner supply 80 of milk cleansing solution is connected to each of the aeration lines 62, 68 by a pair of valves 82, 84, respectively, at a pair of tee junctions 86, 88 disposed downstream of tee junctions 76, 78, respectively. A control board 90 mounted, in this example, directly on the console of the system 10 is of the character to be programmed to provide signals and power for controlling the above components to deliver a selected beverage, or perform other functions such as cleaning cycles or provide and monitor drink counts, fluid levels, and the like, in response to operator input commands impressed upon its key pad 92. Accordingly, as indicated, the control board 90 is coupled to the grinder 12, the brewer assembly 14, the tea water valve 24, the steam valves 28, 34, the milk pumps 48, 54, the purge air valves 72, 76, and the cleaning valves 82, 84. A control board presently preferred and satisfactory for these functions is produced by the Gicar Company of Merate. Italy, and designated as Model 888.

In discussing the operation of the system, it will first be assumed that the espresso system 10 is in the mode to produce selectively a latte with steamed milk or a cappuccino with foamed milk; and both milks A and B are of the same character—as though the milk supply 42 were a simple reservoir with, however, two output lines 47, 53. In such mode, the air inlet orifice 60 is reduced or closed; and air inlet orifice 66 is open.

In response then to an operator request at the key pad 92, the controller 90 instructs the grinder 12 to grind and deliver to the brewer assembly 14 a charge of ground coffee which is processed thereby to deliver a brewed measure of espresso liquor to the beverage cup 21. Meanwhile the normally closed A steam valve 28 is opened, the A milk pump is energized to draw milk through the milk line 47 and force it to the steam line 52 where it is steamed and heated and delivered to the cup 21. It may be noted that the restrictors 32, 38, disposed in the steam lines contiguously to their output above the cup 21, provide an advantage in controlling splash or steam spray in the cup.

When, on the other hand, the operator request at the key pad 92 is for a cappuccino beverage, the grinding and brewing operations are the same; but the normally closed B steam valve 34 is opened, the B pump 54 is energized, and air from the open B orifice 66 is drawn into the milk which is thereby foamed as it receives the air and is intermixed therewith in the oscillating piston action of the pump. The thusly-foamed milk is then further aerated and heated as it joins the steam in the steam line 33 and progresses on to the beverage cup 21.

A different mode of operation for the system 10 for providing only one style of beverage, e.g. lattes, having, however, a choice of milk types, e.g. regular, A, or non fat, B. In such a mode, both air inlet orifices 60,66 are adjusted to their closed configuration. An operator request for, e.g., a regular milk latte causes the controller 90 to energize the A milk pump 48, the A steam valve 28, and draw from the regular milk container 44. An operator request for a non fat latte results in energizing the B pump 54 and the B steam valve 34 to draw milk for the container 46 and steam it in the steam line 33.

Conversely, if only cappuccinos are to be served, albeit with a choice of foamed milk, both A and B air inlet orifices are adjusted to their open configuration whereby the operator's choice is then to choose whether regular milk is drawn and foamed from the A container 44 by the A pump 48 and A steam valve 28 or non fat milk is drawn and foamed from the B container 46 by the B pump 54 and B steam valve 34.

In detail the actual timing and sequencing of the functions of the components as outlined above are as follows. Assuming that the espresso system 10 is in the mode for providing selectively a latte or a cappuccino beverage to the cup 21, irrespective of whether the two sources of milk are different or the same in character, and that the A air inlet orifice 60 is closed and orifice 66 is open. The following timing and sequencing occurs when an operator requests a latte and executes at the keypad the initiation of the beverage making process. The grinder 12 is energized for a predetermined amount of time to deliver a specific amount of ground coffee to the brewer assembly 14 which receives it in its brewing cylinder and is compressed by its packing piston. Then its water pump is turned on and its brewing valve permits a specific volume of brewing water to flow from the pressurized hot water supply 22. Then the brewing valve is closed and the brewing assembly water pump is turned off. After a predetermined time for the brewed liquor to exit the cake of coffee grounds and pour into the cup 21 the cake is ejected and the brewing assembly is reset to receive a subsequent charge of ground coffee.

At the same time that the brewing cycle is begun, the A steam valve 28 is opened shortly, e.g. 2 seconds before the A milk valve 48 is energized for a predetermined period, e.g. 15 to 20 seconds to pump the required volume of milk for the requested beverage. After approximately a second into the pumping phase, the steam valve 28 is briefly closed, e.g. 1 second to remove momentarily its back pressure on the milk pump 48 to assist and assure its priming: the steam valve 28 then remains open to deliver the steamed milk through the steam line 27 to the cup 21. While the steam valve 28 is open, the purge valve 72 is opened to the atmosphere briefly, e.g. 3 seconds, before the milk pump 48 is turned off. This permits the milk present in the milk line to be either pumped forwardly to the steam line 27 or to drain back into the A container 44. The A steam valve 28 remains on for a few more seconds to purge its line 27 of residual milk therein. It has been determined to be beneficial, to clear the milk pump of residual milk during the purge phase, to close the steam valve momentarily, e.g., 1 to 2 seconds, just after the purge valve opens in order to permit the beginning of the purging of the milk pump to be free of any back pressure from the steam line.

The timing and sequencing steps are similar when a cappuccino beverage is requested at the key pad 92: the coffee brewing steps may be exactly the same, while the milk aeration steps utilize the B pump 54 and its associated system, including the open B air inlet orifice 66. The milk aeration steps start at a predetermined interval after the grinding and brewing process begins so that the foamed milk is delivered after and on top of the brewed coffee liquor already poured into the cup 21 and include first the opening of the B steam valve 34 followed after a 2 second, for example, interval by turning on the B milk pump 54 for its full run of pumping the predetermined measure of foamed milk. Approximately 1 second after the milk pump is turned on the steam valve 34 is closed for approximately 1 second to assure that pump priming occurs. The steam valve then remains open until a few seconds after the milk pump 54 is turned off. Again, the purge valve 76 is opened to the atmosphere for a few seconds before the pump is turned off to permit residual milk in the line 53 to return to its container 46 or be pumped on to the steam line 33. Again the steam valve may be closed for 1 or 2 seconds at the beginning of the purge phase to assure that steam backpressure does not impede the forward purging of the residual milk. The difference in the cappuccino cycle is that with the air orifice 66 open, air is drawn into the milk line 53 ahead of the pump 54 whereby at the output of the pump, the milk is highly foamed and is delivered after and on top of the brewed coffee liquor from the brewer assembly 14.

It is to be noted that the independence in the pairs of milk pumps, steam lines, milk sources, and air inlet orifices provides a great deal of versatility in operating modes in permitting choices of beverage style and choices of milk: a first mode may provide cappuccino or latte from one milk type; a second mode may provide cappuccinos with a choice of milk types; a third mode may provide lattes with a choice of milk type; and a fourth mode may provide lattes of one milk type and cappuccinos of another milk type. Further, this number of choices may be doubled by providing a second type of ground coffee to the brewing assembly 14 by bypassing the hopper 16 and grinder 12 and inserting the different coffee directly into the brewer through the bypass chute 18 or by duplicating the hopper and grinder components in place of the bypass chute.

Note also that the operator may request tea water at the keypad 92 whereby the valve 24 is actuated to deliver hot water to the cup 21.

A further aspect of the versatility of the system 10 is that the milk aeration and delivery systems may be operated independently of the coffee brewing process to provide steamed or frothed milk for non coffee purposes including, for example, hot chocolate, or the like, beverages. In addition, cold aerated or fully frothed milk may be served, as e.g. iced latte, by closing the steam valve during substantially all the milk pumping phase and then opening it and the purge valve thereafter to clear the delivery lines of residual milk.

For a periodic cleansing of the milk delivery system and its components, other than the purging and steam cleaning intrinsic with the normal aeration, purging and steam cleaning of each beverage making cycle, the cleaning valves 82, 84 are opened by the controller 90 in response to an operator request on the key pad 92 while the purge valves 72, 76 and steam valves 28, 34 are open and the milk pumps 48, 54 are energized. The milk cleansing solution is then drawn as desired through all the milk contacting elements of the system from the tee junctions 64, 70 (and 86, 88) throughout the final delivery, steam lines 27, 33 and restrictors 32, 38 to their output tips contiguous to the station of the cup 21.

It may be noted that because the milk pumps and steam valves are compact and relatively low in cost, it is feasible in other examples of the invention to incorporate more than the pair of milk lines and steam lines shown in this example. When additional such There have thus been disclosed and described an apparatus combination and method steps of operation which achieve the objects and exhibit the advantages set forth hereinabove.

What is claimed is:

1. A method of aerating and heating milk for beverages comprising
   A. positively pumping refrigerated milk at a predetermined pressure selectively through one of a first and second milk lines;
   B. injecting air at atmospheric pressure into said first line when said pumping is through that line:
   C. selectively forcing steam selectively through one of a first and second steam lines to a beverage cup station;
   D. combining the milk from the milk line selected for pumping, with the steam from the steam line selected for forcing steam therethrough;
   E. delivering the combined milk and steam to the beverage cup station;
   F. maintaining said milk pumping within a refrigerated environment; and
   G. controlling the timing and sequencing of said pumping and steam forcing whereby after a predetermined quantity of milk is pumped, the steam forcing continues momentarily for cleaning said steam line of residual milk.

2. A method of preparing a milk inclusive espresso beverage comprising:

A. grinding and delivering to a brewer a predetermined amount of coffee;
B. brewing said amount of coffee and delivering the resultant beverage, to a beverage cup;
C. positively pumping refrigerated milk at a predetermined pressure selectively thorough one of a first and second milk lines;
D. injecting air at atmospheric pressure into said first line when said pumping is through that line;
E. selectively forcing steam at a pressure less than said predetermined pumping pressure selectively through one of a first and second steam lines to a beverage cup station;
F. combining the milk, from the milk line selected for pumping, with the steam from the steam line selected for forcing steam therethrough;
G. delivering the combined milk and steam to the beverage cup station;
H. maintaining said milk pumping within a refrigerated environment; and
I. controlling the timing and sequencing of said grinding, brewing, pumping, and steam forcing whereby after a predetermined quantity of milk is pumped, the steam forcing continues momentarily for clearing said selected steam line of residual milk, and whereby said combined milk and steam are delivered to said cup station in a desired sequence with respect to the delivering thereto of said brewed resultant coffee beverage.

* * * * *